US012712166B2

(12) United States Patent
Schuetz et al.

(10) Patent No.: US 12,712,166 B2
(45) Date of Patent: Aug. 18, 2026

(54) MASS SPECTROMETER ISOLATION PROFILE ANALYSER

(71) Applicant: Thermo Fisher Scientific (Bremen) GmbH, Bremen (DE)

(72) Inventors: Adrian Schuetz, Bremen (DE); Amelia Corinne Peterson, Bremen (DE); Bastian Reitemeier, Bremen (DE); Bernd Hagedorn, Bremen (DE)

(73) Assignee: Thermo Fisher Scientific (Bremen) GmbH, Bremen (DE)

(*) Notice: Subject to any disclaimer, the term of this patent is extended or adjusted under 35 U.S.C. 154(b) by 495 days.

(21) Appl. No.: 17/986,870

(22) Filed: Nov. 14, 2022

(65) Prior Publication Data

US 2023/0154735 A1 May 18, 2023

(30) Foreign Application Priority Data

Nov. 15, 2021 (EP) .................................... 21208325

(51) Int. Cl.
*H01J 49/00* (2006.01)
*H01J 49/42* (2006.01)

(52) U.S. Cl.
CPC ...... *H01J 49/0009* (2013.01); *H01J 49/0036* (2013.01); *H01J 49/4215* (2013.01)

(58) Field of Classification Search
None
See application file for complete search history.

(56) References Cited

U.S. PATENT DOCUMENTS

| | | | | |
|---|---|---|---|---|
| 7,202,471 | B2 * | 4/2007 | Hondo | G01N 30/7233 250/281 |
| 8,078,427 | B2 * | 12/2011 | Tischler | H01J 49/0036 702/179 |
| 10,267,765 | B2 * | 4/2019 | Wang | G01N 27/623 |
| 2003/0143554 | A1 * | 7/2003 | Berres | G16B 40/10 435/6.1 |
| 2004/0031918 | A1 * | 2/2004 | Schoen | H01J 49/022 250/282 |

(Continued)

FOREIGN PATENT DOCUMENTS

| | | | | |
|---|---|---|---|---|
| CN | 107827960 A | * | 3/2018 | C07K 14/005 |
| CN | 113362899 A | * | 9/2021 | G06N 3/045 |

(Continued)

OTHER PUBLICATIONS

English machine translation for CN-107827960-A (Year: 2018).*

(Continued)

*Primary Examiner* — David E Smith
*Assistant Examiner* — Alina Kaliszewski

(57) ABSTRACT

A method for characterising an isolation profile of a mass spectrometer includes obtaining data of an, or at least one ion species transmitted by a mass spectrometer forming an isolation profile of the mass spectrometer; normalizing the obtained data; providing the normalized data to a deep neural network trained using a plurality of previous isolation profiles; generating from the deep neural network a set of fit parameters of a curve representing a fit to the normalized data; and providing as an output, data representing the curve. The method may be used as part of a calibration procedure for the mass spectrometer.

19 Claims, 13 Drawing Sheets

(56) References Cited

U.S. PATENT DOCUMENTS

| | | | | |
|---|---|---|---|---|
| 2006/0284067 | A1* | 12/2006 | Senko | H01J 49/0036 250/282 |
| 2013/0200258 | A1* | 8/2013 | Skilling | H01J 49/26 250/281 |
| 2013/0206979 | A1* | 8/2013 | Bonner | H01J 49/42 250/281 |
| 2013/0297227 | A1* | 11/2013 | Burton | H01J 49/061 702/27 |
| 2014/0361158 | A1* | 12/2014 | Remes | H01J 49/0009 250/282 |
| 2016/0336164 | A1* | 11/2016 | Remes | H01J 49/4205 |
| 2018/0047549 | A1 | 2/2018 | Quaas et al. | |
| 2018/0166265 | A1* | 6/2018 | Geromanos | H01J 49/0031 |
| 2018/0246027 | A1 | 8/2018 | Vacca et al. | |
| 2018/0277346 | A1* | 9/2018 | Rusinov | H01J 49/4245 |
| 2020/0335316 | A1* | 10/2020 | Madathil | H01J 49/0036 |
| 2021/0174504 | A1* | 6/2021 | Madabhushi | G06T 7/11 |
| 2021/0262992 | A1* | 8/2021 | De Corral | G01N 30/8641 |
| 2022/0152628 | A1* | 5/2022 | Abrahamsson | B03C 1/0335 |
| 2022/0252531 | A1* | 8/2022 | Taya | G01N 37/00 |
| 2022/0365028 | A1* | 11/2022 | Meyer | G01N 27/64 |
| 2023/0080329 | A1* | 3/2023 | Liu | G06V 10/82 382/133 |
| 2023/0136166 | A1* | 5/2023 | Fort | G01L 21/36 250/282 |

FOREIGN PATENT DOCUMENTS

| | | | | | |
|---|---|---|---|---|---|
| CN | 113391072 | A | * | 9/2021 | G01N 33/6848 |
| EP | 3575797 | A1 | * | 12/2019 | G01N 33/6848 |
| WO | WO-2023077166 | A1 | * | 5/2023 | G16B 40/10 |

OTHER PUBLICATIONS

English machine translation for CN-113362899-A (Year: 2021).*

English machine translation for CN-113391072-A (Year: 2021).*

Anonymous, “Method for Estimating Isolation Efficiency,” Research Disclosure, Apr. 4, 2013, XP007142123, pp. 1-7.

EP21208325.7, Extended European Search Report, May 16, 2022, 9 pages.

* cited by examiner

| Isolation Window | RF Theo (Vp) | RF Meas (Vpp) | DC Theo (V) | DC Meas (V) | U Theo (V-DC/Vp) | U Meas (V-DC/Vp) |
|---|---|---|---|---|---|---|
| (195.087652, 1621.9650877) | 208.2400563 | 200.1344587 | 5.444895756 | 5.864656265 | 0.026147207 | 0.028162959 |
| (69.0447246, 1.5) | 59.35547722 | 55.87857324 | 9.802539529 | 10.77192375 | 0.165149705 | 0.181481546 |
| (195.087652, 1.5) | 168.5000406 | 161.6546838 | 28.12399049 | 30.36417599 | 0.166907915 | 0.180202781 |
| (622.0289597, 1.5) | 538.1976756 | 520.2647203 | 90.18721214 | 96.65808168 | 0.167572653 | 0.179595874 |
| (1621.9650877, 3) | 1403.632924 | 1359.958397 | 235.3099987 | 251.6229316 | 0.167643545 | 0.179265481 |
| (2721.8948285, 3) | 2356.083802 | 2284.154607 | 395.2044178 | 422.3672282 | 0.167737844 | 0.179266641 |

Figure 15

MASS SPECTROMETER ISOLATION PROFILE ANALYSER

FIELD OF THE INVENTION

The present invention relates to a system and method for characterising an isolation profile of a mass spectrometer with an example implementation of using the result of this characterisation as part of a configuration and/or calibration process for the mass spectrometer.

BACKGROUND OF THE INVENTION

Different mass spectrometers use different techniques to isolate and identify ions having particular mass-to-charge (m/z) ratios. A quadrupole mass filter consists of four parallel, elongated typically cylindrically- or hyperbolically-milled electrodes containing one or more segments, arranged as two sets of opposing rod pairs around a central axis. RF and DC voltages are applied to electrically-connected opposing rod pairs, wherein an attractive DC voltage that is attractive to the ions is applied to one pair of opposing electrodes and a repulsive DC voltage that is repulsive to the ions is applied to the other pair of opposing electrodes. These attractive DC and repulsive DC voltages are collectively known as the resolving DC. An RF voltage is applied to one pair of opposing electrodes, while an equal and opposite phase RF voltage is applied to the other pair of opposing electrodes. To operate the device as a mass filter and thereby isolate a limited range of ion species having a limited range of mass-to-charge ratios, particular RF and resolving DC voltages are applied, which are controlled by electronics and depend on the mass filter geometry and dimensions. To establish a mapping between a desired range of ions species to be isolated and the appropriate set voltages, the quadrupole mass filter needs to be calibrated.

Establishment of the quadrupole calibration relies upon the collection and analysis of the range of ion species transmitted by the quadrupole for a given set of applied voltages. A proxy for determining the range of ion species that would be transmitted by the quadrupole may be defined as an isolation profile. An isolation profile can be characterised by measuring the transmission range, or isolation width measured at half-height of the isolation profile, while scanning the centre of an isolation range, or isolation centre m/z, and detecting, typically with a second mass analysis device, a single ion species.

Collecting data and analysing the resultant isolation profile accurately enough to achieve an acceptable calibration (or for other purposes) can be time consuming. Furthermore, this process may require careful work by a technician and manual checking of the results, as some data sets can be difficult to process automatically or cause erroneous results leading to the need to repeat manual calibrations.

Therefore, a method and system that overcomes these problems is required.

SUMMARY OF THE INVENTION

A sample that produces a known mass to charge ratio (m/z) ion is introduced into a mass spectrometer (for example, based on a quadrupole and/or Orbitrap™ mass analyser). An isolation profile is formed by monitoring one m/z while scanning the quadrupole centre m/z at a fixed isolation width setting. These data form an isolation profile for the mass spectrometer. The collected data are normalised to a notional intensity scale (e.g., 0 to 1). A deep neural network (DNN) is trained using previous data sets (isolation profiles) that were similarly collected (e.g., using the same or different known m/z ion generating samples). The training data sets are labelled as having known attributes and preferably normalised similarly to the collected data. For example, the training data may be pre-characterised and has associated known full-width at half height peak values and isolation centre m/z values for the isolation profiles. The data may be labelled using differential evolution, for example. In an example implementation, a least square deviation from the differential evolution fit may be used as an error metric. The "Adam" optimizer from the keras package may be used for this purpose. To reduce bias, a gaussian noise layer may optionally be added during training.

The normalised collected (but unlabelled or uncharacterised) data are provided to the DNN. The DNN is used to generate fit parameters of a curve or graph representing a fit to the normalized sample data. The DNN therefore produces information describing a curve that fits the sample data.

On its own, this output information or data is useful for an operator of the mass spectrometer, as it provides a quantitative indication of the performance of the device and can be used to analyse mass spectra obtained from the mass spectrometer. This output data can also be used within a calibration procedure carried out on the mass spectrometer. For example, the method may be iterated between configuration or calibration changes made to the mass spectrometer until an acceptable isolation profile is achieved or particular operating conditions are found (e.g., electrode voltages). Such calibration may be saved as a lookup table, for example. Optionally, the process may be repeated at intervals and/or automatically so that calibration or optimum operating conditions can also be maintained. In some example implementations, the output from the method (e.g., the information that describes the curve) may indicate that maintenance or cleaning of the mass spectrometer is required. A warning or alert may be issued requesting that the corrective action (e.g., cleaning) is carried out in response to parameters of the output reaching a predetermined threshold.

The calibration procedure may be carried out in order to reach a particular requested width and/or centre position of the actual isolation profile of the mass spectrometer. This may be achieved by adjusting DC and RF voltages applied to electrodes or other components within the mass spectrometer (e.g., the quadrupole electrodes).

In accordance with a first aspect there is provided a method for characterising an isolation profile of a mass spectrometer, the method comprising the steps of:

- obtaining data (i.e., first data) of an, or at least one ion species transmitted by a mass spectrometer forming an isolation profile of the mass spectrometer;
- normalizing the obtained data;
- providing the normalized data to a deep neural network trained using a plurality of previous isolation profiles;
- generating from the deep neural network (DNN) a set of fit parameters of a curve representing a fit to the normalized data; and
- providing as an output, data (i.e., second data) representing the curve. This method may be carried out in isolation in order to determine an operating parameter or parameters of the mass spectrometer or used as part of a physical process, such as calibrating, configuring or cleaning the mass spectrometer. Preferably, the output from the DNN are data (second data) defining or fit parameters of the curve. The fit parameters may be used for estimating the full width at half height and/or centre of a curve (i.e., isolation profile approximation).

Optionally, the mass spectrometer may include a quadrupole, in particular a quadrupole mass filter. Accordingly, the isolation profiles may be quadrupole mass filter isolation profiles. However, different mass spectrometers with other mass filters or analysers may have their isolation profiles characterised in this way.

Preferably, the method may further comprise the step of using the fit parameters as the starting point for a curve fit function or procedure. Whilst the fit parameters may in themselves, provide sufficient useful information, carrying out further curve fitting may improve the accuracy and utility of the data. Starting a curve fitting procedure from more accurate fit parameters can speed up the curve fitting process and be more effective than when the raw data is used as the starting point in such a curve fitting process. This is even the case when considering the time taken for the DNN processing.

Advantageously, the further may further comprise the steps of:

executing the curve fit function to generate a curve; and measuring the full width at half height and/or centre of the generated curve.

Preferably, the method may further comprise the steps of:

if the full width, half height and/or centre of the generated curve are outside of predetermined limits then:

adjusting one or more physical configurations of the mass spectrometer; and repeating the steps of the characterisation of the isolation profile until the full width at half height and/or centre of the generated curve are within the predetermined limits. This may be a process carried out by servos or other mechanical devices within the mass spectrometer or may be applied electronically to data generated by the mass spectrometer when carrying out ion m/z measurements, for example.

Optionally, the step of obtaining data of an, or at least one ion species transmitted by a mass spectrometer may comprise generating the data by operating the mass spectrometer. The data may be obtained in advance (e.g., on historic data) or immediately prior to executing the characterisation steps.

Optionally, the curve fit function may be a piecewise-defined function composed of three components having at least three separate parameters. Other curve fit functions may be used.

Preferably, the three components may be based on left and right half-Gaussian functions separated by a line. Other functions may be used.

Optionally, the curve fit function may include any one or more functions of: Gaussian, polynomial of order preferably greater than three, Sigmoid, Lorentzian and Pearson.

Advantageously, the curve fit function may be defined as:

$$f(x) = \begin{cases} x < c - \frac{w}{2}, he^{-\frac{(x-x_l)^2}{2\sigma_l^2}} \\ c - \frac{w}{2} \le x \le c + \frac{w}{2}, h \\ x > c + \frac{h}{2}, he^{-\frac{(x-x_r)^2}{2\sigma_r^2}} \end{cases}$$

where $x_l = c - \frac{w}{2}$, $x_r = c + \frac{w}{2}$ and

-continued $$\sigma_l = \frac{l}{\sqrt{2\log(2)}}, \sigma_r = \frac{r}{\sqrt{2\log(2)}}$$

and where h represents the height of the isolation profile, c is the centre of the isolation profile, l and r are the steepness of the edges of the isolation profile, w is the width of a line forming the top of the curve fit function and w+l+r is the width at half-height of the curve fit function.

Preferably, the method may further comprise the step of optimising the curve fit using a gradient descent procedure. Alternatively, other example algorithms, such as Levenberg-Marquardt algorithm may be used for local optimization of the curve fitting process.

Optionally, the method may further comprise the step of identifying one or more portions of the data outside of the curve. This may indicate a physical problem with the mass spectrometer (e.g., contamination present on the quadrupole).

Preferably, the method may further comprise the step of measuring an area corresponding to the identified one or more portions of data. This can provide a quantitative indication of the level of contamination, for example, which may be outputted.

An output, such as a warning or alert for example, may be generated based on the quantitative indication of the level of contamination.

Optionally, the method may further comprise the step of generating a ratio of the measured area to the area under the curve.

Advantageously, the method may further comprise the step of cleaning the mass spectrometer when the ratio is above a threshold value. Other actions (e.g., manual or automatic) may be taken when this or other thresholds are reached.

Optionally, the method may further comprise the step of generating a quality metric of the mass spectrometer from the curve. This can be used in isolation or as part of other processes and procedures. For example, data collected following the derivation of this quality metric may also be associated with this quality metric as well (i.e., indicating the reliability of the data).

Advantageously, the method may further comprise the step of generating a calibration value or values for the mass spectrometer based on the curve. The calibration value may be used as part of an automatic or manual calibration or may be used within an iterative process, for example.

In accordance with a second aspect, there is provided a mass spectrometer, comprising:

a mass analyser;

a detector; and and means adapted to execute the steps according to any previously described method or method steps.

Optionally, the mass analyser may include a quadrupole and/or an Orbitrap™ mass analyser. The mass analyser has the isolation profile to be characterised by the method. The detector may comprise a second mass analyser, e.g., an Orbitrap™ mass analyser, a time of flight mass analyser, or another quadrupole mass analyser.

In accordance with a third aspect, there is provided a computer program product comprising instructions to cause the device to execute the steps according to any previously described method or method steps.

In accordance with a fourth aspect there is provided a method for calibrating a mass spectrometer, the method comprising the steps of:

- obtaining data (i.e., first data) of an, or at least one ion species transmitted by a mass spectrometer forming an isolation profile of the mass spectrometer;
- normalizing the obtained data (i.e., the first data);
- providing the normalized data to a deep neural network trained using a plurality of previous isolation profiles;
- generating from the deep neural network a set of fit parameters of a curve representing a fit to the normalized data;
- providing as an output, data (i.e., second data) representing the curve; and
- using the output to adjust one or more attributes of the mass spectrometer. For example, the one or more attributes may include different voltages (e.g., DC or AC, typically RF) applied to electrodes within a mass analyser of the mass spectrometer.

Preferably, the calibration method will iterate until the output reaches a threshold and/or iteration limit.

The methods described above may be implemented as a computer program comprising program instructions to operate a computer. The computer program may be stored on a computer-readable medium.

The computer system may include a processor or processors (e.g., local, virtual or cloud-based) such as a Central Processing unit (CPU), and/or a single or a collection of Graphics Processing Units (GPUs). The processor may execute logic in the form of a software program. The processor may form part of the mass spectrometer. The computer system may include a memory including volatile and non-volatile storage medium. A computer-readable medium may be included to store the logic or program instructions. The method may be implemented as part of scripting software or as compiled code. The different parts of the system may be connected using a network (e.g. wireless networks and wired networks). The computer system may include one or more interfaces. The computer system may contain a suitable operating system such as UNIX®, Windows® or Linux®, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 15 shows a table of various calibration values generated from the calibration process of FIG. 14.

It should be noted that the figures are illustrated for simplicity and are not necessarily drawn to scale. Like features are provided with the same reference numerals.

DETAILED DESCRIPTION OF THE PREFERRED EMBODIMENTS

Calibrating a mass spectrometer (and a quadrupole-based mass spectrometer in particular) requires the detection and analysis of the range of ion species transmitted by the quadrupole for a given set of applied voltages. A proxy for determining the range of ion species which would be transmitted by the quadrupole is the collection of an isolation profile. An isolation profile is generated by fixing the transmission range, or isolation width measured at half-height, of the quadrupole while scanning the centre of the isolation range, or isolation centre mass to charge ratio (m/z), and detecting (typically with a second mass analysis device, e.g., an Orbitrap™ mass analyser, or a time of flight mass analyser, or another quadrupole, optionally with an electron multiplier or other detector) a single ion species.

Figure 1:
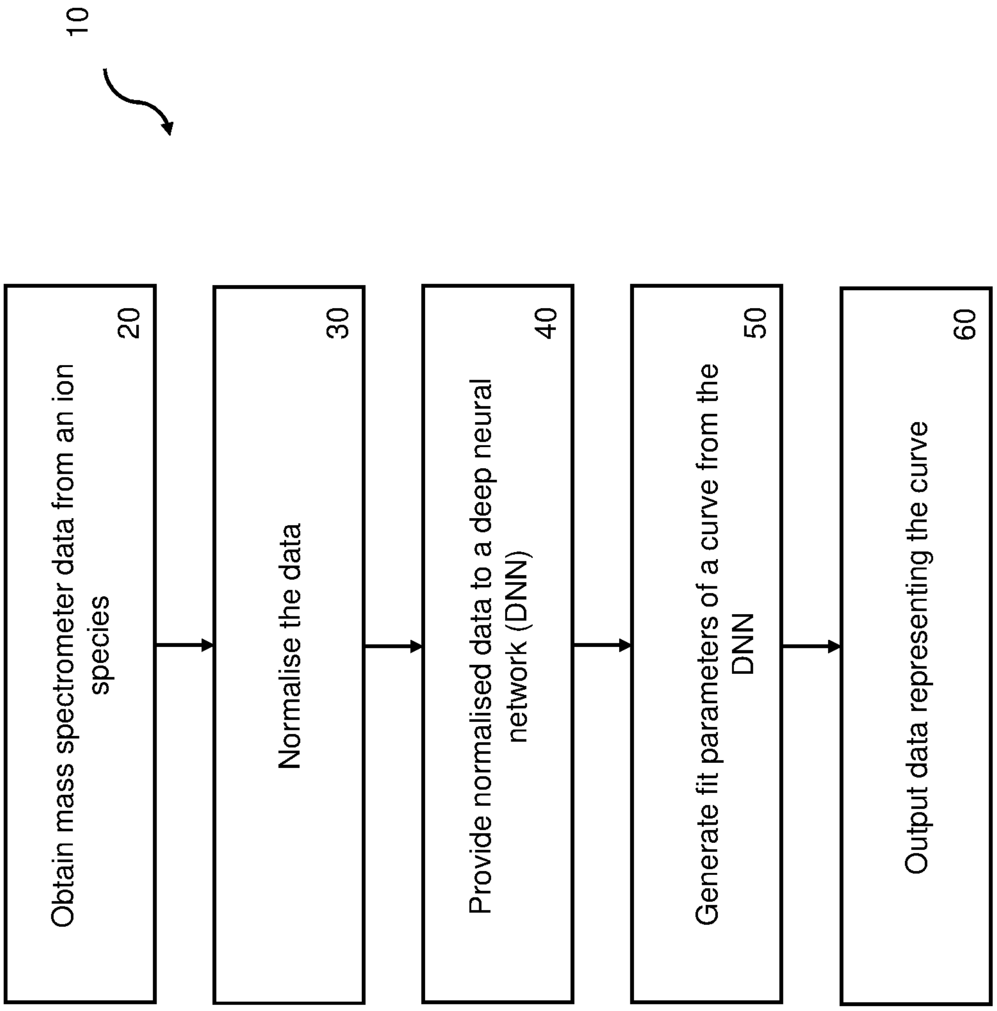
FIG. 1 shows a flow chart of a method for characterising an isolation profile of a mass spectrometer.

FIG. 1 shows a flowchart of a method 10 for characterising the isolation profile of a mass spectrometer. This method 10 may form part of a wider procedure such as that used in the maintenance or calibration of the mass spectrometer.

At step 20, mass spectrometer data from an ion species are obtained. For example, a particular known m/z ion source may be introduced into a mass spectrometer and data collected from this source.

The obtained data are normalised at step 30. For example, the intensity values of the data may be scaled so that data obtained under different conditions can be directly compared. In an example implementation, the data are normalised from zero to one but any arbitrary scale can be used (and remain consistent).

At step 40, the normalised data are provided to a deep neural network (DNN). This DNN has been previously trained with data having labelled well known characteristics. These training data may also be normalised for consistency. The labelling process may use differential evolution for determining optimal fit parameters, for example.

At step 50, the DNN generates fit parameters of a curve that approximates the obtained mass spectrometry data. At step 60, data representing the curve is provided as an output. For example, this may take the form of a mathematical function or graph coordinates.

The fit parameters may take the form of variables or constants of a particular mathematical function, for example. The output data and/or the fit parameters may be used to derive physical attributes of the mass spectrometer that was used to collect the original raw data. In particular, these attributes may describe the isolation profile (in this case, its inherent performance rather than measured samples) of the mass spectrometer. Such attributes may include the full width at half height and/or centre line of the isolation profile. This itself may be used as part of the further methods or procedures, such as calibrating the mass spectrometer or carrying out maintenance such as cleaning or other optimisations. In other words, further processing may not be necessary to characterise the isolation profile.

The method 10 may be repeated or iterated following physical changes to the mass spectrometer or after an amount of time or number of data collections carried out by the mass spectrometer, for example.

Figure 2:
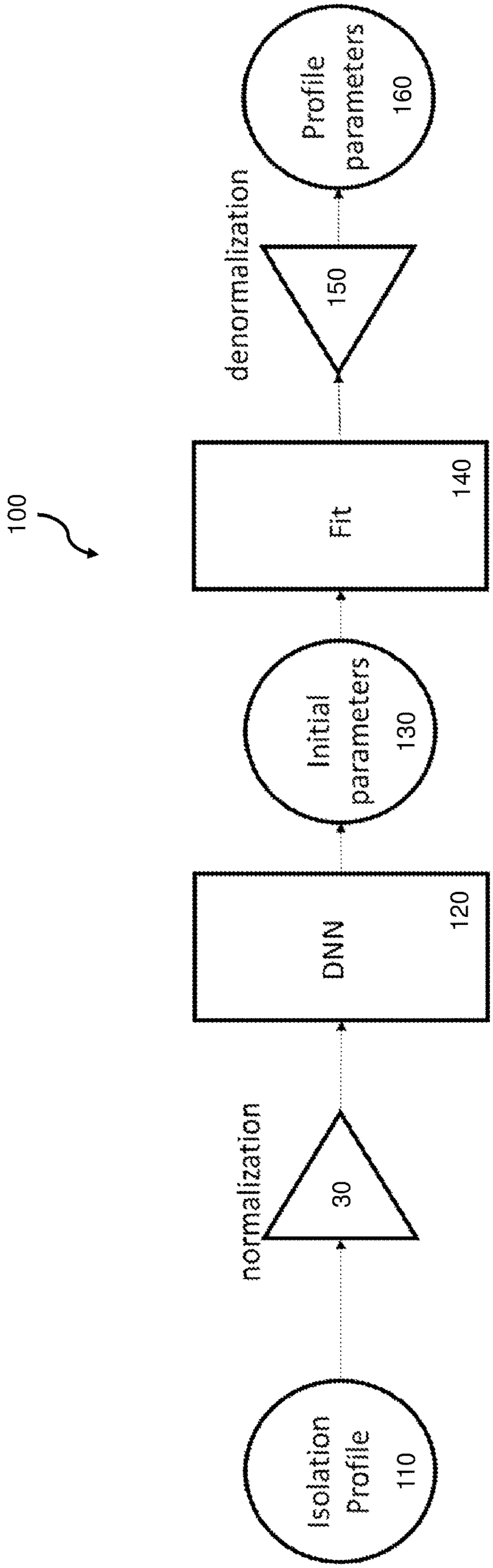
FIG. 2 shows a flowchart of the method of FIG. 1 in more detail.

FIG. 2 shows a further flowchart of a more detailed method 100 used to characterise the isolation profile of a mass spectrometer. In this case, the isolation profile 110 takes the form of raw data collected from a mass spectrometer and this is normalised 30 before being provided to the DNN 120. The DNN 120 executes on the normalised isolation profile data to provide initial parameters 130. These initial parameters 130 are used as the starting parameters for a curve fitting process 140 and executes on a suitable curve fit function. Once that curve fit procedure 140 completes e.g., by reaching a threshold, acceptable fit or perhaps by reaching a set number of iterations, then the resulting curve is denormalised at step 150 and profile parameters 160 are extracted or provided as an output. These profile parameters therefore describe or characterise the isolation profile 110, which can indicate parameters or attributes of the mass spectrometer that was used to obtain the isolation profile data.

Figure 3:
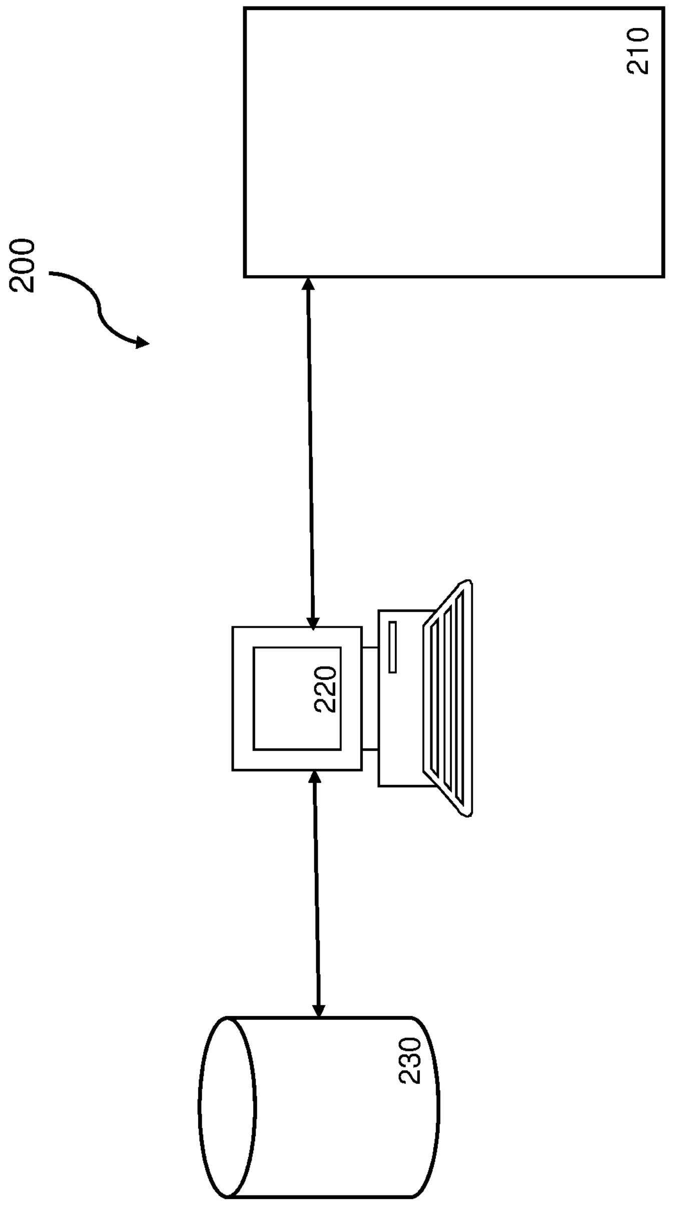
FIG. 3 shows a schematic diagram of a system for characterising an isolation profile of a mass spectrometer.

FIG. 3 shows a schematic diagram of a system 200 for carrying out the methods 10 and 100 described with respect to FIGS. 1 and 2. A mass spectrometer 210 provides isolation profile sample data to processor 220. This processor may be external to the mass spectrometer or incorporated as part of it. For example, the processor 220 may also carry out or control the operation of the mass spectrometer. The mass spectrometer may be a quadrupole based mass spectrometer. The mass spectrometer may be, for example, one of: a quadrupole-time of flight (Q-TOF) hybrid mass spectrometer; a quadrupole-Orbitrap™ hybrid mass series of mass spectrometers from Thermo spectrometer (such as the Q-Exactive™ or Exploris Fisher Scientific™); or a triple quadrupole mass spectrometer. An instance of the DNN (or data representing model parameters of the DNN) may be stored within a memory or database 230. This database may also contain training data for use with the DNN. For example, the DNN may undergo continuous training based on data collected by the mass spectrometer 210 or may have its model parameters set and fixed unless updated from external sources. Different versions of the DNN (e.g., trained using different training data or with data from different mass spectrometers) may be stored, for example.

Figure 4:
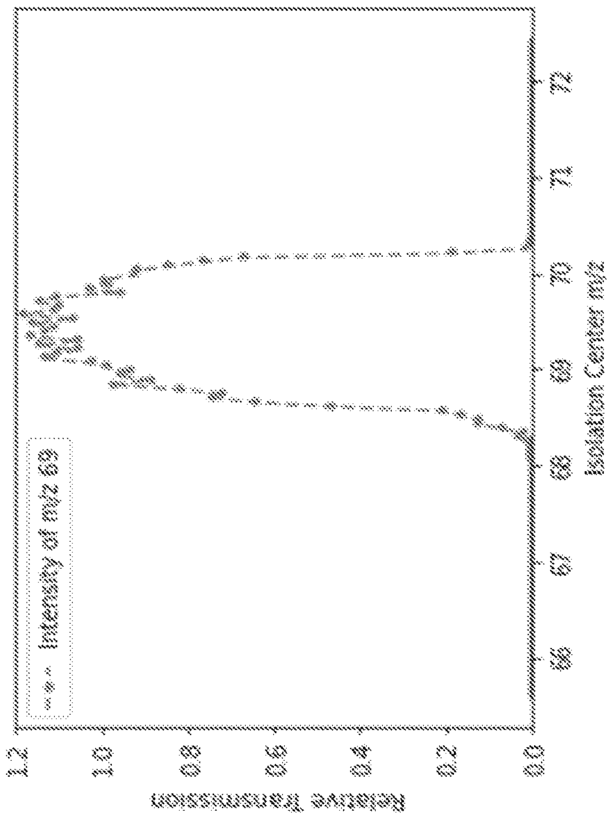
FIG. 4 shows a graph of example data representing an isolation profile from the mass spectrometer of FIG. 3.

In FIG. 4, an example of such an isolation profile for m/z 69 with an isolation width of 1.5 Thomson units (Th) is shown.

The analysis of the isolation profile, that is the determination of its width and its centre, provides an assessment of the quality of the calibration of the mass spectrometer 210 and so can be used during calibration of the device. Further, analysis of the isolation profile can also result in detected aberrant shape characteristics, which can signify errors or faults within the mass spectrometer 210 or associated peripherals and processing or control electronics. These faults may include faulty electronics and poorly manufactured or maintained electrodes.

Figure 5:
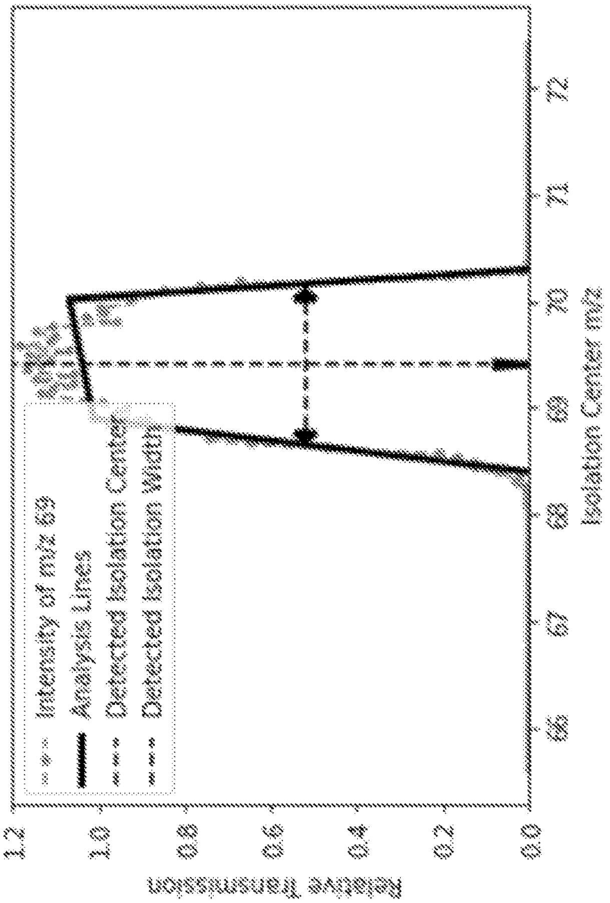
FIG. 5 shows a graph of the example data of FIG. 4, together with a graphical indication of previous characterisation techniques.

A current analysis algorithm of such isolation profiles uses a central section of the rising and falling flanks of the profile to perform linear fits of the flanks. Likewise, an averaged top of the profile can be fit with a line. Determination of the isolation profile shape parameters (centre and the full width at half-height) then proceeds geometrically. An "analyzed" profile for an ideal or regular isolation profile is shown in FIG. 5. This figure indicates the rising and falling flanks or edges of the isolation profile together with an approximated straight line between them.

Due to the steep nature of the profile flanks, this approach necessarily relies on the collection of a large number of samples to properly detect and fit the flanks of the isolation profile. The collection of these samples takes a considerable amount of time. This leads to the quadrupole calibration and evaluation being slow, delaying useful data collection and expending other resources such as known samples and other consumables.

While this method can work for some well-behaved or ideal isolation profiles like that shown in FIG. 4, imperfections in manufacturing of the quadrupole electrodes or contamination on the quadrupole electrodes can result in profiles that cannot be characterised using this approach reliably. This can result in an erroneous estimation of the isolation profile shape parameters (centre and width). Erroneously determined centre and width parameters may further result in incorrect quadrupole calibration parameters and, in turn, inaccurate mass filtering performance.

Figure 7:
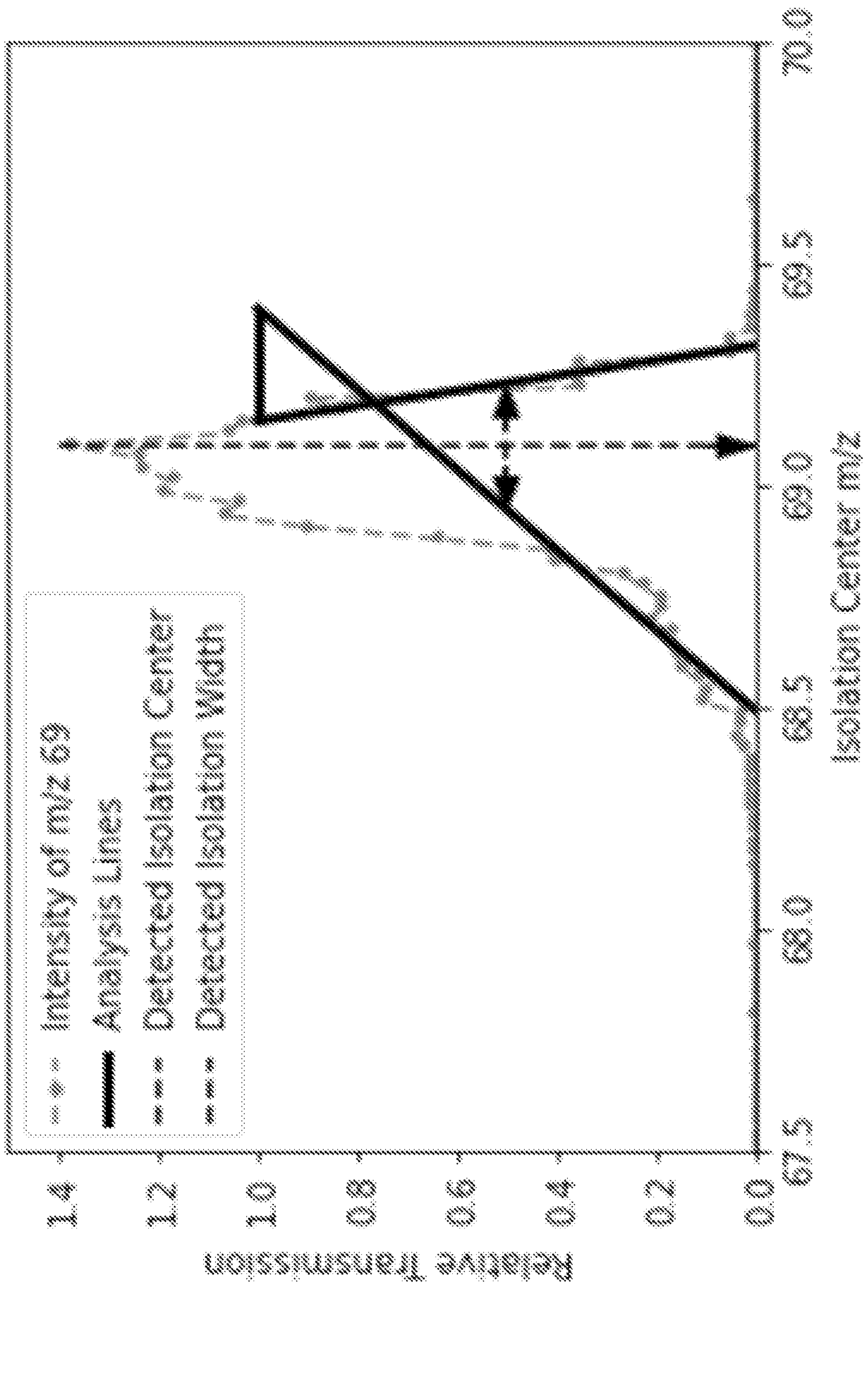
FIG. 7 shows a graph of further example data representing an isolation profile of a mass spectrometer, together with a graphical indication of the results of previous characterisation techniques.

Some collected data sets can exhibit certain abnormalities. For example, isolation profiles may include shoulders (also known as precursors, side-lobes, or side-peaks). For quadrupole performance, a profile shoulder means that for a given isolation centre mass and width, ions with mass-to-charge ratios falling outside of the set isolation range are nevertheless transmitted through the quadrupole with low efficiency. For the above-described isolation profile analysis algorithm, the presence of the shoulder leads to a poor fit of the flank (either rising or falling) and thereby poor estimation of the isolation width and isolation centre m/z. An example of such an isolation profile is shown in FIG. 7 together with its analysis results using this prior technique. The main profile has an approximate width of about 0.4 Th in this example (excluding any contribution from the shoulder data). However, the algorithm erroneously reports an isolation width of 0.28 Th. Additionally, this algorithm, is not suited to detect the presence of shoulders or precursors or identifying them as requiring further examination. Should such an isolation profile characterisation be used in a calibration procedure then this could result is very poor results.

The method 10, 100 described with reference to FIGS. 1 and 2 provides a more stable and reliable characterisation of isolation profiles, especially in the context of quadrupole calibration and evaluation. This leads to a more robust and accurate calibration and evaluation of the mass spectrometer 210. Furthermore, this method can be reliably carried with fewer data resulting in faster and more efficient calibration and evaluation of the mass spectrometer 210.

In one example implementation, the method 10, 100 includes a piecewise-defined function applied to the isolation profile after generating fit parameters using the DNN. This piecewise-defined function approximates the shape of an average isolation shape.

Figure 6:
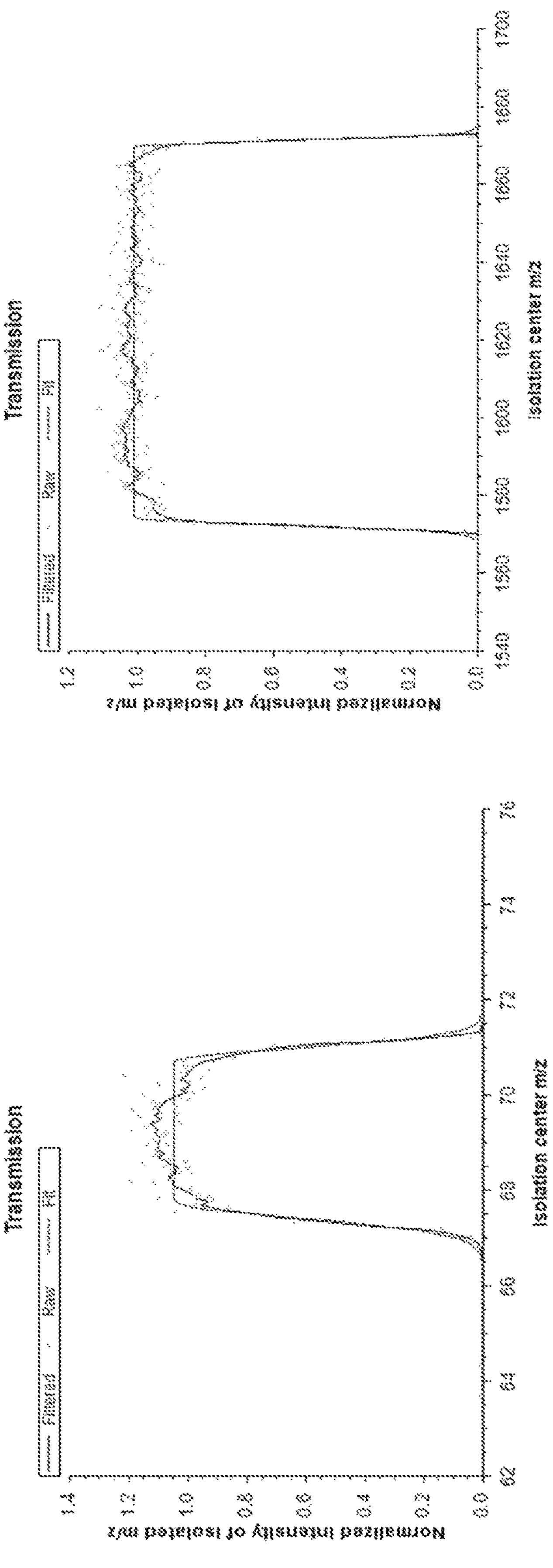
FIG. 6 shows graphs of further example data representing different isolation profiles.

In an example implementation, a curve fit function is used from the Python™ SciPy library (scipy.optimize.curve_fit) to fit a piecewise-defined function to the isolation profile. In this example, the piecewise-defined function is composed of three intervals and has three free parameters. The left most interval (lower m/z) is defined by a half-Gaussian. This is followed by a flat line for the second interval and another half-Gaussian (higher m/z). The flat line may be arbitrarily small (including having a zero size), for example. Example isolation profiles having different shapes and lengths of flat lines are shown in FIG. 6. The curve fit function (a piecewise-defined function) may be described in the following equations:

$$f(x) = \begin{cases} x < c - \frac{w}{2}, he^{-\frac{(x-x_l)^2}{2\sigma_l^2}} \\ c - \frac{w}{2} \le x \le c + \frac{w}{2}, h \\ x > c + \frac{h}{2}, he^{-\frac{(x-x_r)^2}{2\sigma_r^2}} \end{cases} \quad \text{equation 1}$$

$$x_l = c - \frac{w}{2}, x_r = c + \frac{w}{2} \quad \text{equation 2}$$

$$\sigma_l = \frac{l}{\sqrt{2\log(2)}}, \sigma_r = \frac{r}{\sqrt{2\log(2)}} \quad \text{equation 3}$$

Figure 8:
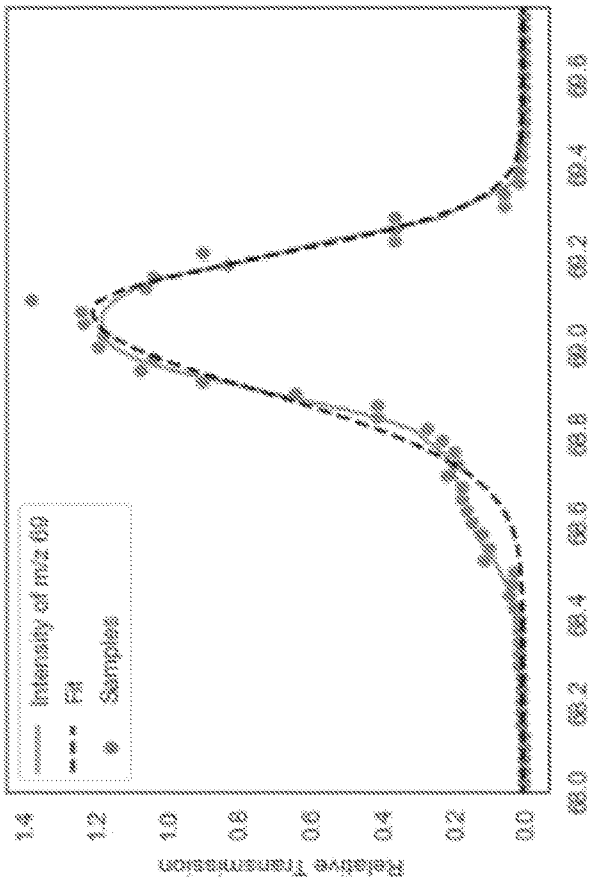
FIG. 8 shows a graph of example data representing an isolation profile of a mass spectrometer and results of the characterisation method of FIGS. 1 and 2.

The function is defined in a way that the fit parameters represent properties of the isolation profile. The parameter h represents the height of the isolation profile. The height of the isolation profile is indicative of the number of transmitted ions. The parameter c indicates the centre of the isolation profile and therefore the centre mass of the isolation profile. Parameter w indicates the width at the top of the isolation profile (i.e., the width of the flat top). The parameters l and r indicate the steepness of the edges of the isolation profile. Between c−w/2 and c+w/2, the model function has a maximum height h. Therefore, w+l+r is the full width at half height and is a measure of the width of the isolation range. An example fit can be seen in FIG. 8.

The DNN is used to predict the fit parameters and is trained using thousands of raw profiles as an input training set. The profile fit parameters are determined by differential evolution as a ground truth. The trained DNN can in some example implementations, reduce the fit parameter calculation time from 2-3 s per profile (for differential evolution) to 1 ms. Whilst the output from the DNN alone may be sufficient for use in certain calibrations and characterisations, further enhancement may be achieved using gradient descent within a curve fitting algorithm (e.g., using the function defined in equations 1, 2 and 3) starting with initial fit parameters provided by the DNN. In some examples, this optional step increases the calculation times to ~80-100 ms but this can be a substantial improvement over the calculation time using differential evolution and does not require the same volume of data.

Figure 9:
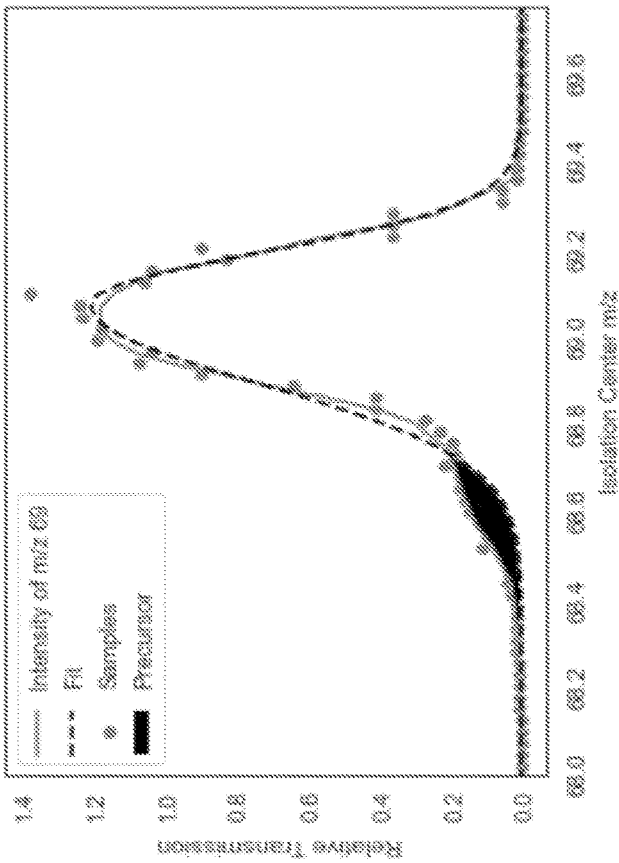
FIG. 9 shows a graph of the example data of FIG. 8 and further results of the characterisation method of FIGS. 1 and 2.

As a further enhancement, areas of positive or negative deviations of the measured isolation profile from the fitted isolation shape, representing the average 'ideal' isolation profile shape, can be measured. Deviation areas exceeding a heuristically (or otherwise) determined threshold may be flagged for manual inspection, and/or used to generate a quality metric for the given calibration or evaluation. An example of the detection of a shoulder/precursor following fitting of the isolation shape is shown in FIG. 9. In this example, an area falling under the sample data but outside of the fitted parameters is found. A ratio can be calculated of this area over the total area under the fitted curve. The ratio can be used to derive a quality metric or to issue a warning or other maintenance request.

Artifacts can be identified by investigating the residual of the obtained fit. As described above, this can be done by measuring areas under the curve at certain positions (as provided in the example shown in FIG. 9). This could be further enhanced by looking at the area also considering the specific mass associated with the area. Furthermore, the residual curve could be investigated with completely different approaches such as but not limited to thresholding, wavelet transformation (or other frequency analyses methods) and filtered for characteristic shapes.

Figure 10:
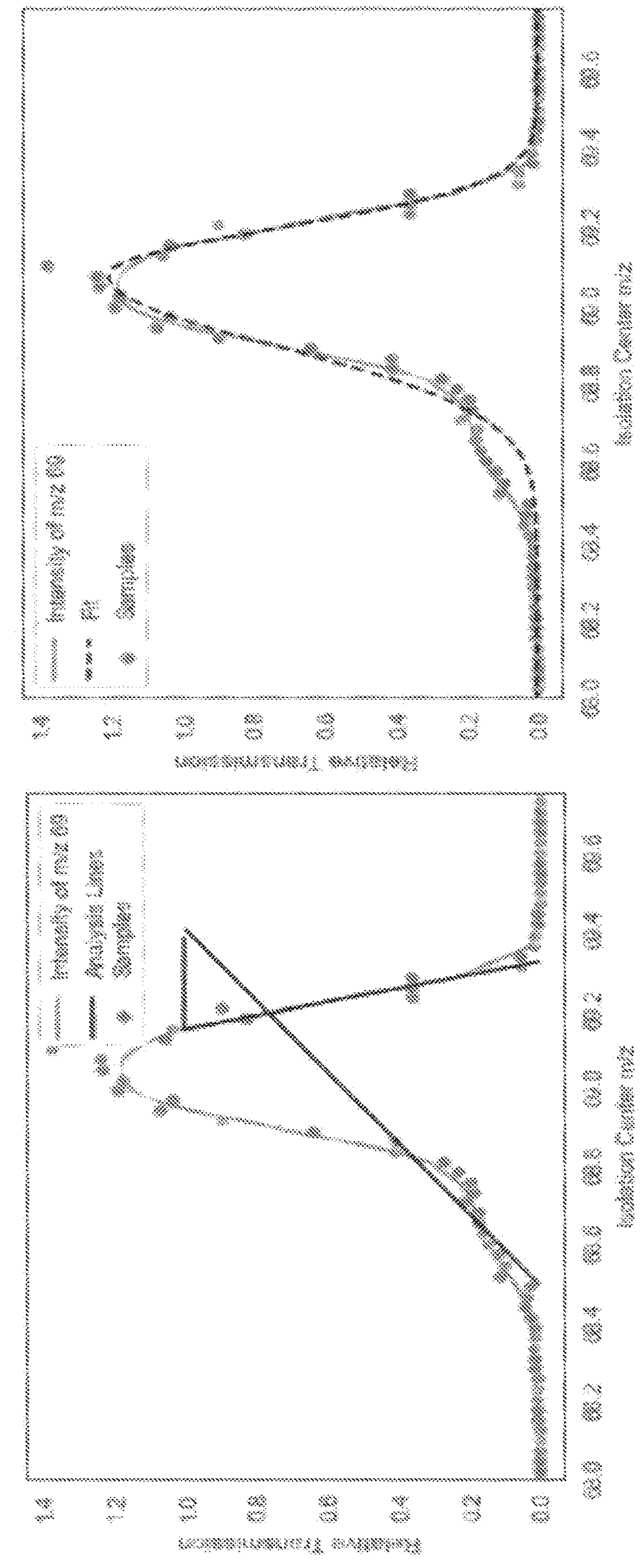
FIG. 10 shows a further graph of the example data of FIG. 7 together with a graphical indication of the results of previous characterisation techniques adjacent the graph of the example data of FIG. 8, so that the two graphs and method results can be compared.

The method of characterisation offers more stability when faced with irregular shaped isolation profiles. This avoids unpredictable results, especially when the isolation profile shape differs significantly from an ideal shape. An example of this advantage is displayed in FIGS. 9 and 10. As can be seen with these two graphs next to each other (with results from both old (left graph) and new (right graph) methods shown in FIG. 10), the prior method fails to correctly extract the shape of the isolation profile. The improved algorithm (results shown in the graph on the right) approximates the isolation profile nearly perfectly while ignoring the precursor on the left flank.

Learning over time: The method 10, 100 can further improve the predictions of the DNN on a quadrupole-by-quadrupole basis. From profiles collected over time on a particular instrument, the DNN can iteratively adapt to the particular characteristics of an individual quadrupole by re-training. This may improve predictions over time, thereby reducing the time required for or even obviating the need for the gradient descent optimization following parameter prediction by the DNN.

Detection of contamination: By enabling the detection of isolation profile characteristics differing from the 'ideal' average isolation profile shape, the method 10, 100 enables tracking of such deviations over time. For example, the gradual development of a shoulder on isolation profiles can be a sign of quadrupole contamination. Since the method 10, 100 provides a quantifiable measure of the shoulder (i.e., as an area of deviation from the fit), the instrument can use the gradual increase in deviations to warn an operator that the quadrupole requires cleaning, or even pre-emptively schedule a field service engineer appointment maintenance.

The following describes an example calibration procedure using the fit parameters provided by method 10, 100. This example calibration procedure is carried out on a quadrupole mass spectrometer but other mass spectrometer calibration techniques may be used.

The quadrupole is calibrated in four steps, three of which use the analysis of quadrupole isolation profiles, and thereby determined shape parameters (isolation centre m/z, isolation width), to inform and arrive at calibration coefficients. The four steps are described below. FIGS. 11 to 15 illustrate this example calibration process with specific values and variables. However, different values and variables may be used 1. Rough Calibration This first step performs a rough calibration of the quadrupole by collecting three sets of data from the mass spectrometer to roughly describe the Mathieu-space of the quadrupole. For each data set, the quadrupole RF and resolution (DC/RF ratio) are adjusted iteratively until the ion or ions of interest is/are just barely stably transmitted through the quadrupole. For two iterations with single ions (one for a low m/z and one for a high m/z), the iteration attempts to decrease the signal to noise ratio (S/N) of the ion of interest to 10 by placing the ion at the tip of the Mathieu diagram. For the iteration using two ions (a low and a high m/z), the iteration attempts to decrease the intensities of the ions to 50% of their respective original intensities. This effectively finds the intersection points of the ion-specific Mathieu diagrams.

Figure 11:
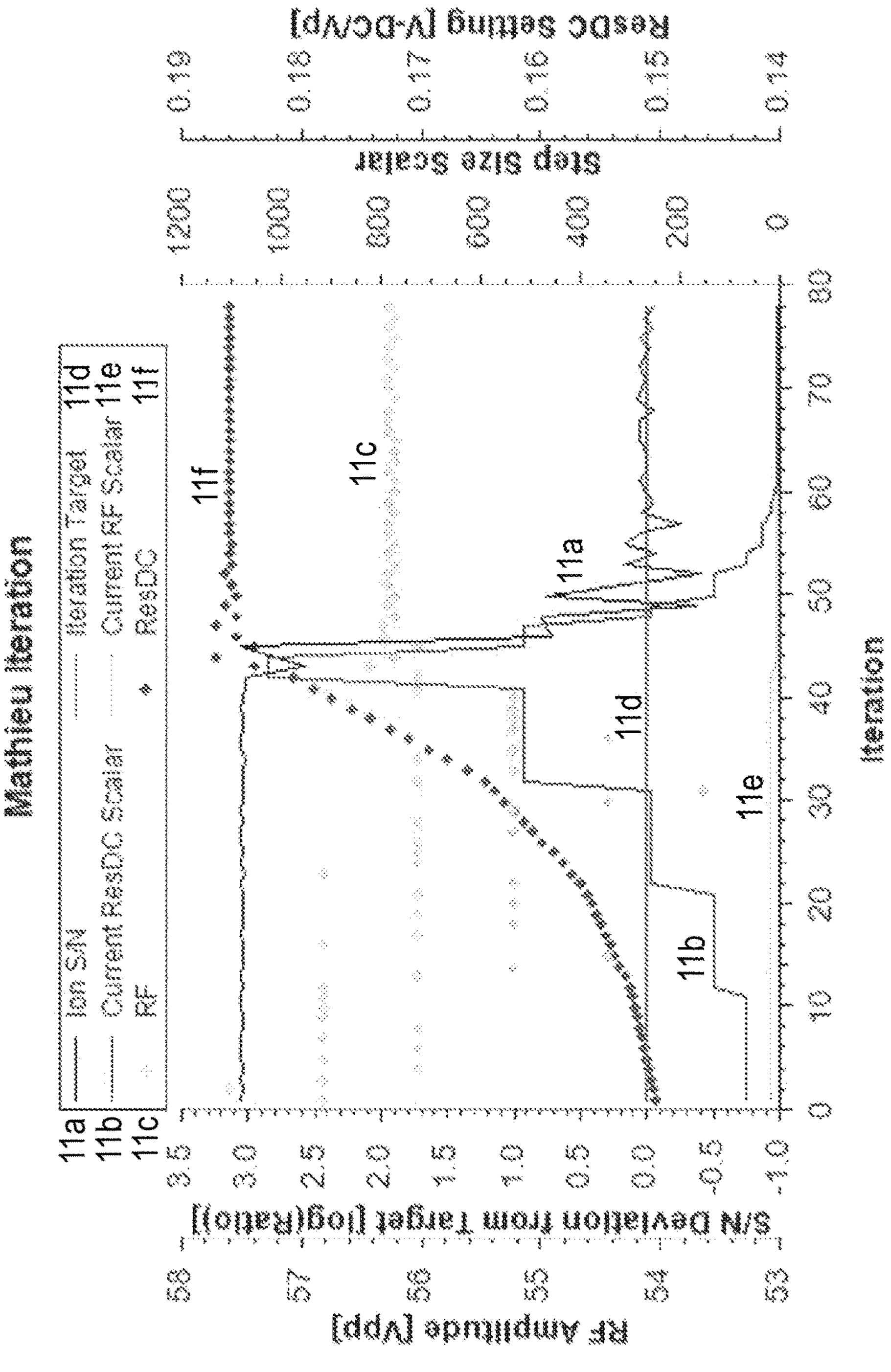
FIG. 11 shows a graph of example data showing test results obtained during a calibration process on the mass spectrometer.
Figure 12:
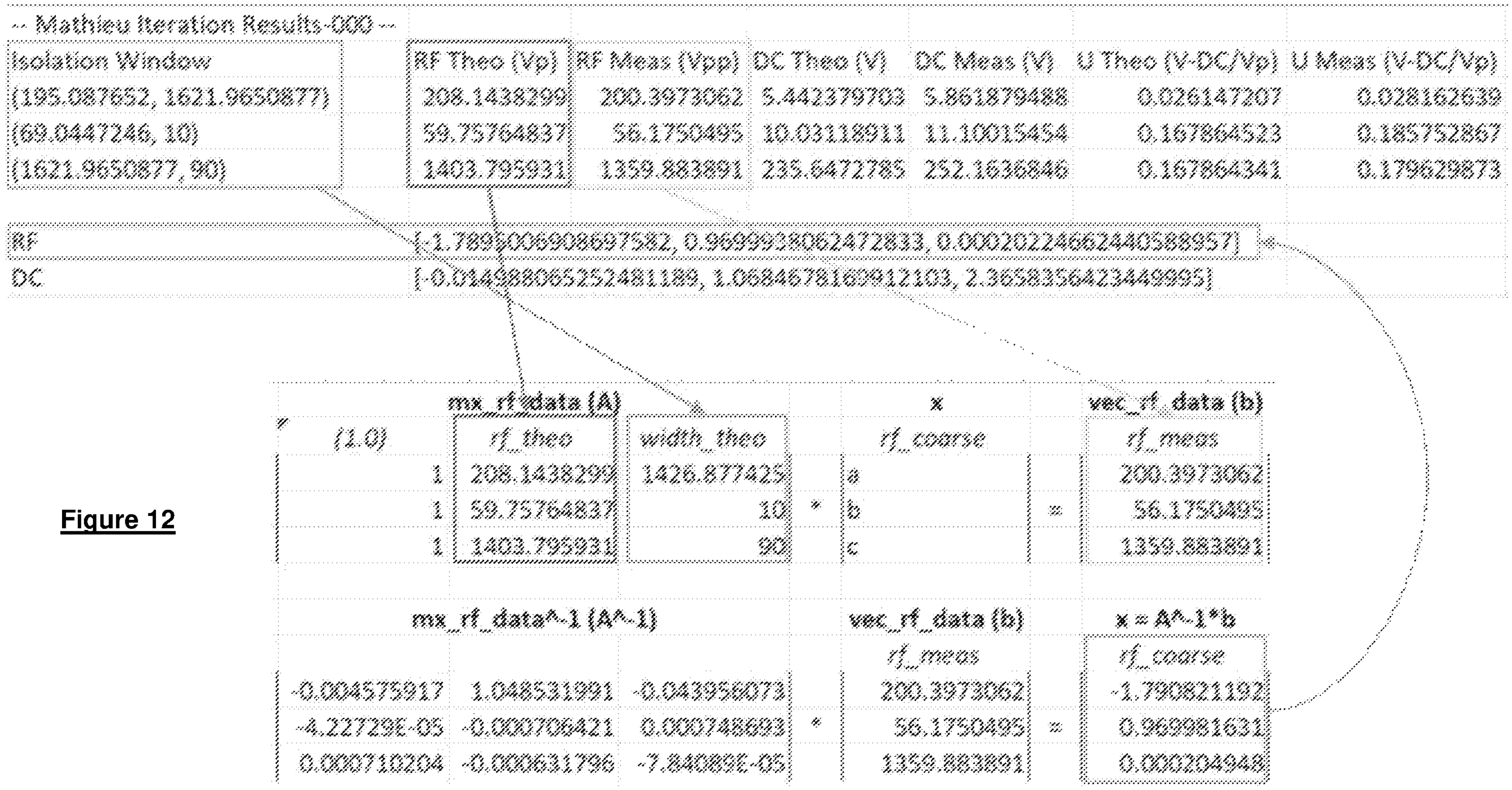
FIG. 12 shows a table of example data showing test data, equation variables used during the calibration process of FIG. 11 and calculation steps.
Figure 13:
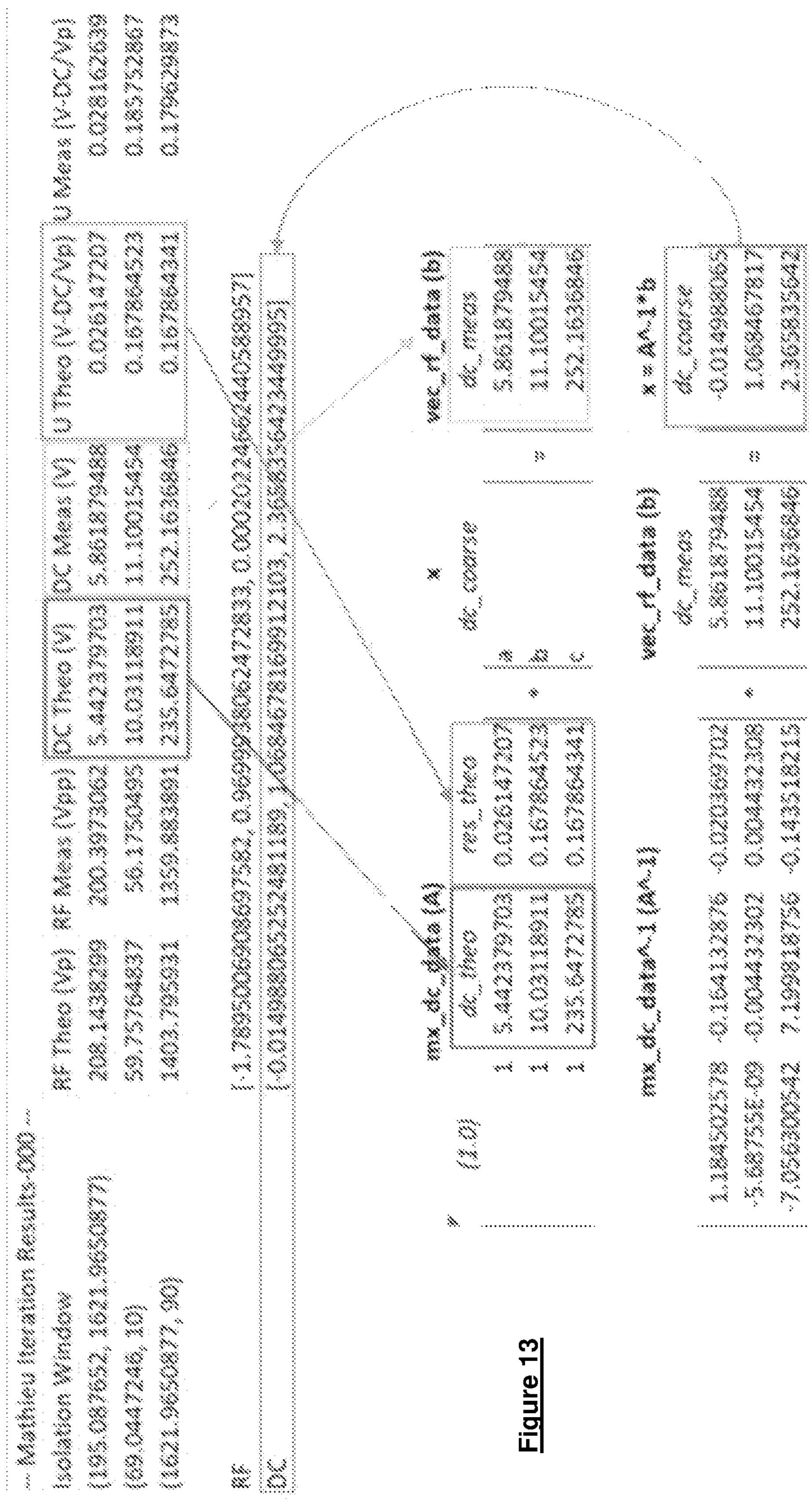
FIG. 13 shows a further table of example data showing test data, equation variables used during the calibration process of FIG. 11 and further calculation steps.

In this example, an iteration on one m/z is carried out to find the RF and resolution (DC/RF ratio) required to place the ion at the tip of the Mathieu diagram (see FIG. 11).

The measured RF and resolution (DC/RF ratio) at the end of a successful iteration are then used to solve the following linear system of equations to generate a set of RF and DC coefficients. These may be described as coarse calibration coefficients.

As shown below in equation 4, the RF coefficients [a, b, c] are inputs to the following linear equation:

$$rf=a+b*rf\_\text{theo}+c*\text{width\_theo} \qquad \text{equation 4}$$

where

- rf is the actual RF amplitude in Vpp that the instrument should apply to the quadrupole given a requested isolation centre m/z and width,
- rf_theo is the theoretical RF amplitude given by the Mathieu equation or function for the calibrated quadrupole RF frequency and quadrupole geometry ($r_0$) given the requested isolation centre m/z and width, and
- width_theo is the requested isolation width. Example data are shown as tables in FIG. 12 with the arrows indicating how these example data are used.

As shown below, the DC coefficients [a, b, c] are inputs to the following linear equation 5:

$$dc=a+b*dc\_\text{theo}+c*\text{res\_theo} \qquad \text{equation 5}$$

where

- dc is the actual resolving DC voltage in V that the instrument should apply with opposite signs to the two opposing quadrupole rod pairs given a requested isolation centre m/z and width,
- dc_theo is a theoretical resolving DC voltage given by the Mathieu equation for the calibrated quadrupole RF frequency and quadrupole geometry ($r_0$) given the requested isolation centre m/z and width, and
- res_theo is a theoretical resolution value (DC/RF ratio) given by the Mathieu equation for the calibrated quadrupole RF frequency and quadrupole geometry ($r_0$) given the requested isolation centre m/z and width.

Data illustrating this calculation are shown in FIG. 13, again with the arrows indicating how these example data are used.

The RF and DC coefficients are then used for the next step.

2. Wide Calibration

In this second step, a wide calibration process uses the coarse calibration coefficients determined in the rough calibration (Step 1) to take further measurements to refine the coarse calibration coefficients. This process may be defined as 'iterating to width'.

In the wide calibration, the coarse calibration coefficients are used to set the RF and resolution (DC/RF ratio) required to isolate a mass at an isolation width of 1.5 or 3 Th width (for lower or higher m/z respectively in this example calibration). Other example widths may be used. An isolation profile with these settings is acquired and the isolation profile analysis algorithm (i.e., method 10, 100 described above) is used to measure the real width of the profile. As the method 10, 100 can be carried out with fewer data points and in less time, then the overall time for successful calibration can be lower. If the real width of the profile differs from the desired isolation width, then a proportionally larger or smaller isolation width is selected based on the observed width deviation. An isolation profile is recollected as further sample data from the mass spectrometer (at the different RF and resolution values determined by the new, requested, isolation width). This process may be iterated until the measured isolation profile's width matches, within some tolerance or threshold, the initially requested isolation width.

Figure 14:
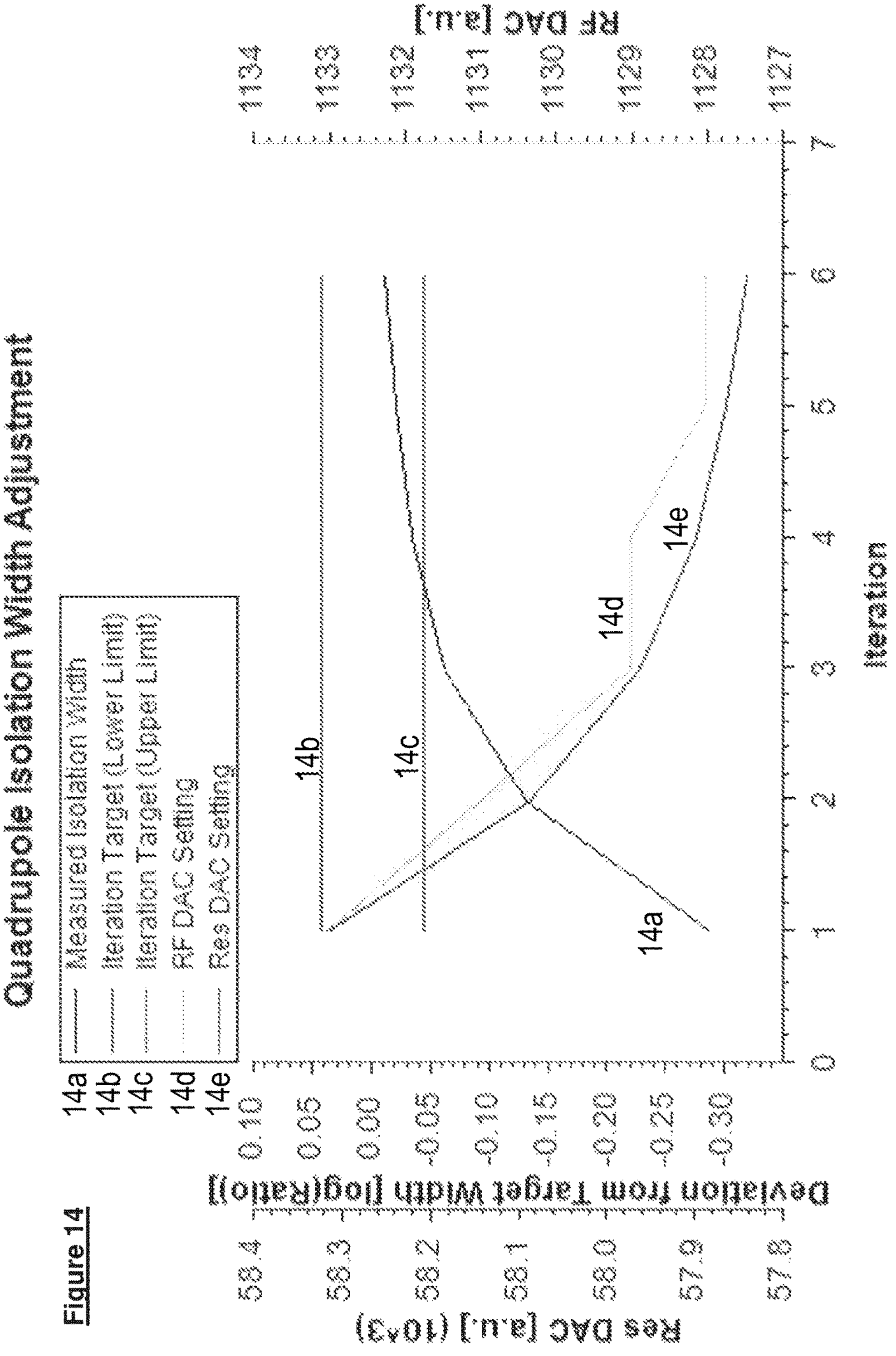
FIG. 14 shows a graph of example test data acquired during the calibration process, as well as equation variables.

An example of the "iteration to width"-process is given below and illustrated using the graph of FIG. 14:

In this example, an isolation width 1.5 Th was requested and an isolation width of about 0.75 Th was measured (deviation from target width ~−0.3, shown as plot (14a) on this graph increasing as a curve from −0.3 to 0.00). Based on this deviation, in the next iteration the system was configured to use a wider isolation width of 1.88 Th (1.5 Th+0.5*(1.5−0.75) Th), which resulted in the application of lower RF and lower resolution values. See upper (14d) and lower (14e) traces curving down from around 0.04 to around −0.30, respectively. The upper curve (14d) is the RF DAC setting and the lower curve (14e) is the Res DAC setting.

The isolation profile acquired with a configured isolation width of 1.88 Th resulted in a measured isolation width of about 1.1 Th (deviation from target width ~−0.13) which is closer to the desired 1.5 Th. Thus, in the next iteration the mass spectrometer is configured for an even larger isolation width (with application of even lower RF and resolution values) and profile acquired. This process continues until the desired isolation width of 1.5 Th is reached, whereby the RF and resolution values that are required to generate the profile of requested width, become known to the operator.

In this example calibration procedure, six different "iterations to width" for m/z spanning the mass range were performed. The data from these iterations are shown in the table of FIG. 15. The RF and resolution (DC/RF ratio) values required to generate an isolation profile having the correct width for all the iterations are used as rf_meas and dc_meas to once again recalculate the coarse calibration coefficients. However, this is achieved using an overdetermined system of equations using the least squares method.

The coarse calibration coefficients are used during normal system operation to set the RF and resolution values for isolations spanning the mass range where the requested isolation width is >=3 Th. For isolation widths <3 Th, where more accuracy may be required in the applied RF and resolution values, a third calibration step can be implemented (i.e., narrow calibration).

3. Narrow Calibration

The purpose of the narrow calibration step is to generate a look-up table. This look-up table contains m/z values spanning the mass range, measured isolation widths from very narrow (0.2 Th) up to 3 Th (for example), and RF and resolution value correction factors. When an isolation profile is requested with width <3 Th, the four closest points (in terms of m/z and measured width) to the requested isolation centre m/z and width are used via interpolation to determine the RF and resolution correction factors to apply on top of the RF and resolution values given by the coarse calibration coefficients.

To populate the look-up table, numerous isolation profiles are collected for m/z spanning the mass range, at isolation widths up to 3 Th or greater. Using the isolation profile analysis algorithm, the measured isolation centre and isolation width for each profile are determined. To find the corresponding RF and resolution value correction factors between the measured points and coarse calibration-corrected values, the RF and resolution values from the centre of the measured isolation profile (center_rf, center_res) are used. From these are subtracted the calculated RF and resolution values given by the coarse calibration coefficients for the "true" isolation profile (the exact mass by the ion species is known, i.e., theo_mass, as is the correct width of the isolation profile by the measured width, i.e., real_width). These deltas then form correction factors, that along with the measured isolation width, populate the look-up table.

4. Isolation Calibration Check

In this last step, the accuracy of the full quadrupole calibration (coarse calibration coefficients with look-up table) is checked by acquiring numerous isolation profiles for m/z spanning the mass range and varying isolation widths. To collect each profile, the system uses the full quadrupole calibration to determine the RF and resolution values to apply to the quadrupole. Following profile acquisition, the isolation profile analysis algorithm (i.e., method 10, 100) is used to determine the measured isolation centre m/z and width. These are compared against the theoretical (requested) isolation centre m/z and width to determine if the full quadrupole calibrations meet a required specification.

In this way, the method of characterising mass spectrometer isolation profiles can be used to calibrate the mass spectrometer and enhances and optimise its operation (e.g., by adjusting the particular voltages applied to electrodes when obtaining sample data). Without this characterisation of isolation profiles, the calibration process may take longer and/or result is lower reliability or repeatability. Characterising mass spectrometer isolation profiles can also indicate when calibration or other maintenance is necessary. For example, the method 10, 100 may be used as part of a service diagnostic tool that may include a graphical user interface (GUI). Reports may be generated that may include figures such as the graphs of FIGS. 7 and 8. These reports may be available to a service engineer, for example. Profiles may be automatically flagged for manual inspection for troubleshooting purposes, for example. Calibration may be carried out at monthly intervals but can depend on quadrupole usage.

As will be appreciated by the skilled person, details of the above embodiment may be varied without departing from the scope of the present invention, as defined by the appended claims.

For example, different functions may be used within the curve fit procedure. Whilst the Gaussian function has been described, further examples include but are not limited to polynomials of order >=3, Sigmoid function, Lorentzian curve and Pearson function. Whilst the examples described above relate to a mass spectrometer including a quadrupole (and Orbitrap™ mass analyser) the general method may be applied to different mass spectrometers. However, the fit function may need to be adjusted and the DNN trained on data collected from the specific mass spectrometer. The method may be implemented in embedded scripting software running on the on-board instrument computer (inside the mass spectrometer). The isolation profile data may be stored with the database or file store 230 as JSON files, for example. The calibration process described is one example calibration process. Others may be used, especially with different types of mass spectrometers.

Training data may have advance processing applied. For example, before the training the data is normalized, extremely misshapen isolation profiles may be removed. Furthermore, badly labelled data may be removed or filtered from the data set. For training the DNN, the Python™ package "keras" may be used, for example.

In an illustrative example, the piecewise-defined function described by equations 1, 2 and 3, i.e., composed of three intervals and having three free parameters with the left most interval (low m/z) defined by a half-Gaussian, followed by a flat line (including zero length and above) for the second interval and then another half-Gaussian forming the right most interval (high m/z), can be used in isolation to characterise isolation profiles. In other words, in this illustrative example, such a function can be used directly on raw isolation profile data (for example but not limited to quadrupole mass spectrometer data) and used to provide or output a curve fitted to these data without starting from fit parameters generated by a DNN. Such a resultant curve (or parameters or variables of equations 1, 2 and 3) can also be used to generate full width at half height and centre values to be used directly or as part of any of the described calibration or maintenance procedures (e.g., cleaning electrodes, issuing warnings regarding the need to carry out maintenance, automatically calibrating a mass spectrometer, etc.). This illustrative example process can be used with any of the features described with reference to the process that includes use of the DNN.

In accordance with a fifth aspect there is provided a method for characterising an isolation profile of a mass spectrometer, the method comprising the steps of:

obtaining data of an, or at least one ion species transmitted by a mass spectrometer forming an isolation profile of the mass spectrometer;

fitting a curve to the data using a curve fit function, wherein the curve fit function is a piecewise-defined function composed of three components having at least three separate parameters, and the three components are based on left and right half-Gaussian functions separated by a line; and providing as an output, data representing the curve.

The data representing the curve may comprise fit parameters of the curve. The fit parameters may be used for estimating the full width at half height and/or centre of the curve (i.e., an approximation of the isolation profile).

In accordance with a sixth aspect, there is provided a mass spectrometer, comprising:

a mass analyser;

a detector; and and means adapted to execute the steps according to the method of the fifth aspect.

In accordance with a seventh aspect, there is provided a computer program product comprising instructions to cause the mass spectrometer to execute the steps according to the method of the fifth aspect.

In accordance with an eighth aspect there is provided a method for calibrating a mass spectrometer, the method comprising the steps of:

obtaining data (i.e., first data) of an, or at least one ion species transmitted by a mass spectrometer forming an isolation profile of the mass spectrometer;

fitting a curve to the data using a curve fit function, wherein the curve fit function is a piecewise-defined function composed of three components having at least three separate parameters, and the three components are based on left and right half-Gaussian functions separated by a line;

providing as an output, data (i.e., second data) representing the curve; and using the output to adjust one or more attributes of the mass spectrometer. For example, the one or more attributes may include different voltages (e.g., DC or AC, typically RF) applied to electrodes within a mass analyser of the mass spectrometer.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for characterising an isolation profile of a mass spectrometer, the method comprising the steps of:

obtaining data of an, or at least one ion species transmitted by a mass spectrometer forming an isolation profile of the mass spectrometer;

normalizing the obtained data;

providing the normalized data to a deep neural network trained using a plurality of previous isolation profiles;

generating from the deep neural network a set of fit parameters of a curve representing a fit to the normalized data;

using the fit parameters as the starting point for a curve fit function;

executing the curve fit function to generate a curve; and providing as an output, data representing the curve.

2. The method of claim 1, wherein the mass spectrometer includes a quadrupole.

3. The method of claim 1 further comprising the steps of:

measuring the full width at half height and/or centre of the generated curve.

4. The method of claim 3 further comprising the steps of:

if the full width at half height and/or centre of the generated curve are outside of predetermined limits then:

adjusting one or more physical configurations of the mass spectrometer; and repeating the steps of the characterisation of the isolation profile until the full width, half height and/or centre of the generated curve are within the predetermined limits.

5. The method of claim 1, wherein the curve fit function is a piecewise-defined function composed of three components having at least three separate parameters.

6. The method of claim 5, wherein the three components are based on left and right half-Gaussian functions separated by a line.

7. The method of claim 1, wherein the curve fit function includes any one or more functions of: Gaussian, polynomial of order greater than three, Sigmoid, Lorentzian and Pearson.

8. The method of claim 1, wherein the curve fit function is defined as:

$$f(x) = \begin{cases} x < c - \frac{w}{2}, he^{-\frac{(x-x_l)^2}{2\sigma_l^2}} \\ c - \frac{w}{2} \le x \le c + \frac{w}{2}, h \\ x > c + \frac{h}{2}, he^{-\frac{(x-x_r)^2}{2\sigma_r^2}} \end{cases}$$

-continued $$\text{where } x_l = c - \frac{w}{2},\ x_r = c + \frac{w}{2} \text{ and}$$

$$\sigma_l = \frac{l}{\sqrt{2\log(2)}},\ \sigma_r = \frac{r}{\sqrt{2\log(2)}}$$

and where h represents the height of the isolation profile, c is the centre of the isolation profile, l and r are the steepness of the edges of the isolation profile, w is the width of a line forming the top of the curve fit function and w+l+r is the width at half-height of the curve fit function.

9. The method of claim 1, further comprising the step of optimising the curve fit using a gradient descent procedure.

10. The method of claim 1, wherein the step of obtaining data of an, or at least one ion species transmitted by a mass spectrometer comprises generating the data by operating the mass spectrometer.

11. The method of claim 1, further comprising the step of identifying one or more portions of the data outside of the curve.

12. The method of claim 11 further comprising the step of measuring an area corresponding to the identified one or more portions of data.

13. The method of claim 12 further comprising the step of generating a ratio of the measured area to the area under the curve.

14. The method of claim 13, further comprising the step of cleaning the mass spectrometer when the ratio is above a threshold value.

15. The method of claim 1, further comprising the step of generating a quality metric of the mass spectrometer from the curve.

16. The method of claim 1, further comprising the step of generating a calibration value for the mass spectrometer based on the curve.

17. A mass spectrometer, comprising:

a mass analyser;

a detector; and means adapted to execute the steps of:

obtaining data of an, or at least one ion species transmitted by a mass spectrometer forming an isolation profile of the mass spectrometer;

normalizing the obtained data;

providing the normalized data to a deep neural network trained using a plurality of previous isolation profiles;

generating from the deep neural network a set of fit parameters of a curve representing a fit to the normalized data;

using the fit parameters as the starting point for a curve fit function;

executing the curve fit function to generate a curve; and providing as an output, data representing the curve.

18. The mass spectrometer of claim 17, wherein the mass analyser includes a quadrupole and/or an Orbitrap™ mass analyser.

19. A computer program product comprising instructions to cause a mass spectrometer to execute the steps of:

obtaining data of an, or at least one ion species transmitted by the mass spectrometer forming an isolation profile of the mass spectrometer;

normalizing the obtained data;

providing the normalized data to a deep neural network trained using a plurality of previous isolation profiles;

generating from the deep neural network a set of fit parameters of a curve representing a fit to the normalized data;

using the fit parameters as the starting point for a curve fit function;

executing the curve fit function to generate a curve; and providing as an output, data representing the curve.

* * * * *